(12) United States Patent
Hesselbrock et al.

(10) Patent No.: US 10,383,473 B2
(45) Date of Patent: Aug. 20, 2019

(54) METHOD AND AN APPARATUS FOR PREPARING A BREWED BEVERAGE

(71) Applicant: MELITTA SINGLE PORTIONS GMBH & CO. KG, Minden (DE)

(72) Inventors: Katrin Hesselbrock, Osnabrueck (DE); Sven Neuhaus, Bad Oeynhausen (DE); Jan Pahnke, Minden (DE); Gerold Schandl, Minden (DE); Robert Köhler, Ober-Ramstadt (DE); Markus Ungerer, Mühltal (DE); Thomas Weber, Mühltal (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 254 days.

(21) Appl. No.: 15/325,432

(22) PCT Filed: Jun. 3, 2015

(86) PCT No.: PCT/EP2015/062356
§ 371 (c)(1),
(2) Date: Jan. 10, 2017

(87) PCT Pub. No.: WO2016/005110
PCT Pub. Date: Jan. 14, 2016

(65) Prior Publication Data
US 2017/0143156 A1    May 25, 2017

(30) Foreign Application Priority Data
Jul. 11, 2014    (DE) .................. 10 2014 109 765

(51) Int. Cl.
*A47J 31/36*    (2006.01)

(52) U.S. Cl.
CPC ....... *A47J 31/3633* (2013.01); *A47J 31/3628* (2013.01); *A47J 31/3638* (2013.01); *A47J 31/3676* (2013.01)

(58) Field of Classification Search
CPC .. A47J 31/407; A47J 31/3633; A47J 31/3638; A47J 31/44; A47J 31/60;
(Continued)

(56) References Cited

U.S. PATENT DOCUMENTS

| 7,681,491 B2 | 3/2010 | Agon et al. |
| 8,178,139 B2 | 5/2012 | Versini |

(Continued)

FOREIGN PATENT DOCUMENTS

| DE | 2432141 A1 | 1/1976 |
| DE | 11 2012 001 531 T5 | 12/2013 |

(Continued)

OTHER PUBLICATIONS

English Translation of German Search Report for DE 10 2014 109 765.3, dated Mar. 10, 2015.
International Search Report for PCT/EP2015/062356, dated Aug. 17, 2015.
Written Opinion for PCT/EP2015/062356, dated Aug. 17, 2015.
German Search Report for DE 10 2014 109 765.3, dated Mar. 10, 2015.
Singaporean Search Report for related SG Application No. 11201610834Q, dated Aug. 1, 2017.

*Primary Examiner* — Hong T Yoo
(74) *Attorney, Agent, or Firm* — FisherBroyles, LLP; Robert Kinberg

(57) ABSTRACT

A method and apparatus for preparing a brewed beverage includes positioning a capsule with a brewing ingredient at a lateral opening of a brewing chamber. Heated water is conveyed to into the brewing chamber to brew the beverage by filling the capsule with the heated water. An outlet valve on of the brewing chamber is opened for filling a vessel with the brewed beverage through a feed nozzle. The brewing chamber is moved together with the feed nozzle from a brewing and filling position, where the capsule is positioned at the brewing chamber and the feed nozzle is above a (Continued)

passage for filling the vessel, to a rinsing position where the capsule is removed from the brewing chamber and the nozzle is above a guide element for directing water for disposal. In the rinsing position, the brewing chamber is rinsed with rinse water which is disposed via the nozzle and the guide element.

10 Claims, 10 Drawing Sheets

(58) Field of Classification Search
CPC .... A47J 31/46; A47J 31/3623; A47J 31/3676; A47J 31/3604; A47J 31/3619; A47J 31/3695; A47J 31/0668; B65D 85/8043; B65D 85/804; B65D 85/8046; A23F 3/18
See application file for complete search history.

(56) References Cited

U.S. PATENT DOCUMENTS

| | | |
|---|---|---|
| 2005/0132892 A1 | 6/2005 | Hall |
| 2011/0189350 A1 | 8/2011 | Van Belleghem et al. |
| 2012/0285334 A1 | 11/2012 | DeMiglio et al. |

FOREIGN PATENT DOCUMENTS

| | | |
|---|---|---|
| DE | 20 2012 012 851 U1 | 3/2014 |
| EP | 1937118 A1 | 7/2008 |
| EP | 2112093 A1 | 10/2009 |
| EP | 2159167 A1 | 3/2010 |
| EP | 2211670 B1 | 8/2010 |
| EP | 2543290 A1 | 1/2013 |
| FR | 2908970 A1 | 5/2008 |

METHOD AND AN APPARATUS FOR PREPARING A BREWED BEVERAGE

CROSS-REFERENCE TO RELATED APPLICATIONS

This application is a U.S. National Stage Application of International Patent Application No. PCT/EP2015/062356, filed Jun. 3, 2015, which claims benefit of German Patent Application No. 10 2014 109 765.3, filed Jul. 11, 2014.

TECHNICAL FIELD

The present invention relates to a method and an apparatus for preparing a brewed beverage.

BACKGROUND OF THE INVENTION

EP 1 937 118 discloses an apparatus for preparing a brewed beverage, in which an infusion container and a capsule for producing an infused beverage, in particular tea, are supplied with hot water. After the discharge of the infused beverage, a cleaning agent is introduced into the infusion container before the capsule is removed. Although the capsule ensures a certain amount of sealing of the infusion container, the injection of the cleaning agent leads to the problem that no pure detergent liquid is present at the outlet of the infusion container but residues of the infusion beverage from the capsule. The result of the cleaning is thus unsatisfactory at least in a bottom region of the infusion container.

EP 2 159 167 discloses an apparatus for preparing a brewed beverage. The capsule is pierced on the rear side for the infusion process and liquid is injected into the capsule via a needle, which can then flow through a screen on one side of the capsule into the brewing chamber. This brewing apparatus can operate in a substantially pressureless manner and can also be used for preparing tea. The brewing apparatus can be rinsed after the brewing.

SUMMARY OF THE INVENTION

It is therefore the object of the present invention to provide a method and an apparatus for preparing a brewed beverage which allow effective handling and wherein the result of the rinsing is improved.

This and other objects are achieved by a method for preparing a brewed beverage, which in one embodiment, includes the following steps: positioning a capsule with an ingredient for brewing the beverage at a lateral opening of a brewing chamber; heating and conveying water to the brewing chamber; introducing the heated water into the brewing chamber; brewing the beverage in the brewing chamber by filling the capsule with heated water; opening of a valve on an outlet of the brewing chamber and filling a vessel with the brewed beverage through a feed nozzle; subsequent to the opening and filling steps, moving the brewing chamber together with the feed nozzle from a brewing and filling position to a rinsing position, wherein in the brewing and filling position the capsule is positioned at the brewing chamber and the feed nozzle is at a filling position above a passage for filling the vessel, and in the rinsing position the capsule is removed from the brewing chamber and nozzle is above a guide element for directing water for disposal; and when the brewing chamber is in the rinsing position, rinsing the brewing chamber with rinse water and disposing of the rinse water via the nozzle and the guide element The object is also achieved by an apparatus for preparing a brewed beverage, which in one embodiment includes: a device to produce heated water and to convey the heated water; a brewing chamber into which the heated water is introduced, the brewing chamber having a lateral opening and a bottom side; a positioning device for positioning a capsule with an ingredient for brewing a beverage at the lateral opening of the brewing chamber; an outlet on the bottom side of the brewing chamber; a feed nozzle coupled to the outlet; a passage arranged between the feed nozzle and a vessel to be filled with brewed beverage; an inlet on the brewing chamber for introducing hot water into the brewing chamber; a guide element arranged for guiding rinse water passing through the outlet of the brewing chamber; a nozzle coupled to the inlet, wherein the nozzle includes a plurality of openings distributed over a circumference of the nozzle through which the hot water passes into the brewing chamber; and a drive device to move the brewing chamber, wherein the brewing chamber is movable, together with the feed nozzle, by the drive device in order to move the feed nozzle from a filling position above the passage for filling the vessel to a rinsing position above the guide element.

In the method in accordance with the invention, a capsule is positioned at first at a lateral opening of the brewing chamber, and a beverage is then prepared in the brewing chamber, which is optionally supplied on the bottom side of the brewing chamber to a container after a specific brewing period of more than 30 seconds for example. The capsule is then removed from the lateral opening and the brewing chamber is rinsed. It is thus ensured that no residues from the capsule can contaminate the brewing chamber during the rinsing process. Although the lateral opening can be flushed at least partly by rinsing liquid after the removal of the capsule, the lateral opening can be arranged above a collecting container so that the emerging rinsing liquid is collected there and does cause any problems. Furthermore, the result of the cleaning is improved because the capsule is automatically ejected directly after the brewing process, i.e. before the rinsing, and the rinsing liquid is not contaminated by residues of the ingredients of the capsule. Cleaning can further occur directly after the brewing process, which is especially advantageous during the brewing of tea in order to prevent surface drying.

In accordance with the invention, the brewing chamber is moved together with a filler neck after the brewing process in order to move the filler neck from a filling position above a passage for filling the container to a rinsing position above a guide element in order to then rinse the brewing chamber. It is thus ensured that the rinsing liquid meets the guide element and can be discharged there to a collecting basin and the brewed beverage in the container thus cannot be contaminated.

Heated water is preferably used during rinsing, which is introduced via an upper inlet into the brewing chamber. As a result, all walls of the interior space of the brewing chamber can be wetted with rinsing liquid so that all components wetted with tea can be rinsed.

In a further embodiment, the brewing chamber is displaced after the brewing process relative to an insertion chute for the capsule in order to eject the capsule to a collecting container. The capsule can be moved against a stop during displacement should the capsule be attached to a seal of the brewing chamber. This ensures secure removal of the capsule before the rinsing process.

In the apparatus in accordance with the invention, an inlet for the introduction of hot water and an outlet are provided on the brewing chamber, wherein a nozzle with several openings distributed over the circumference is provided on the inlet. As a result, both hot water for initiating the brewing process and hot water for a rinsing process can be introduced via the nozzle. The inlet can thus also be used for rinsing, wherein the openings on the nozzle which are distributed over the circumference ensure that the walls to the interior space of the brewing chamber are wetted over the surface, especially over the entire surface. This is further promoted by a parabolic upper region of the brewing chamber and allows a very good rinsing result. The injection of rinsing liquid above the lateral opening further leads to only low losses of rinsing liquid at the lateral opening because a portion of the rinsing liquid film flows around the opening.

A drive device is provided for the displacement of the brewing chamber, especially an electric motor with a spindle drive, in order to enable the displacement of the brewing chamber between the brewing position, an insertion position and a rinsing position.

The nozzle preferably protrudes with a tip into an interior space of the brewing chamber and can comprise several openings distributed over the circumference, so that rinsing liquid can be injected in different directions into the brewing chamber via the openings. The nozzle is preferably arranged on an upper inlet of the brewing chamber, while a switchable valve is provided on the bottom side of the brewing chamber in order to allow controlling the brewing time within the brewing chamber.

For the purpose of brewing tea, the brewing chamber can be at least twice as large, especially at least four times as large, as the volume of the capsule. The volume of the brewing chamber without the capsule can lie in a range for example of between 0.1 l to 1 l, preferably 0.15 l to 0.7 l.

A drive device is preferably provided for displacing the brewing chamber, especially an electric motor with a spindle drive, in order to allow the displacement of the brewing chamber between a brewing position, an insertion position and a rinsing position.

BRIEF DESCRIPTION OF THE DRAWINGS

The invention will be explained below in closer detail by reference to an embodiment shown in the enclosed drawings, wherein.

DETAILED DESCRIPTION OF THE INVENTION

Figure 1:
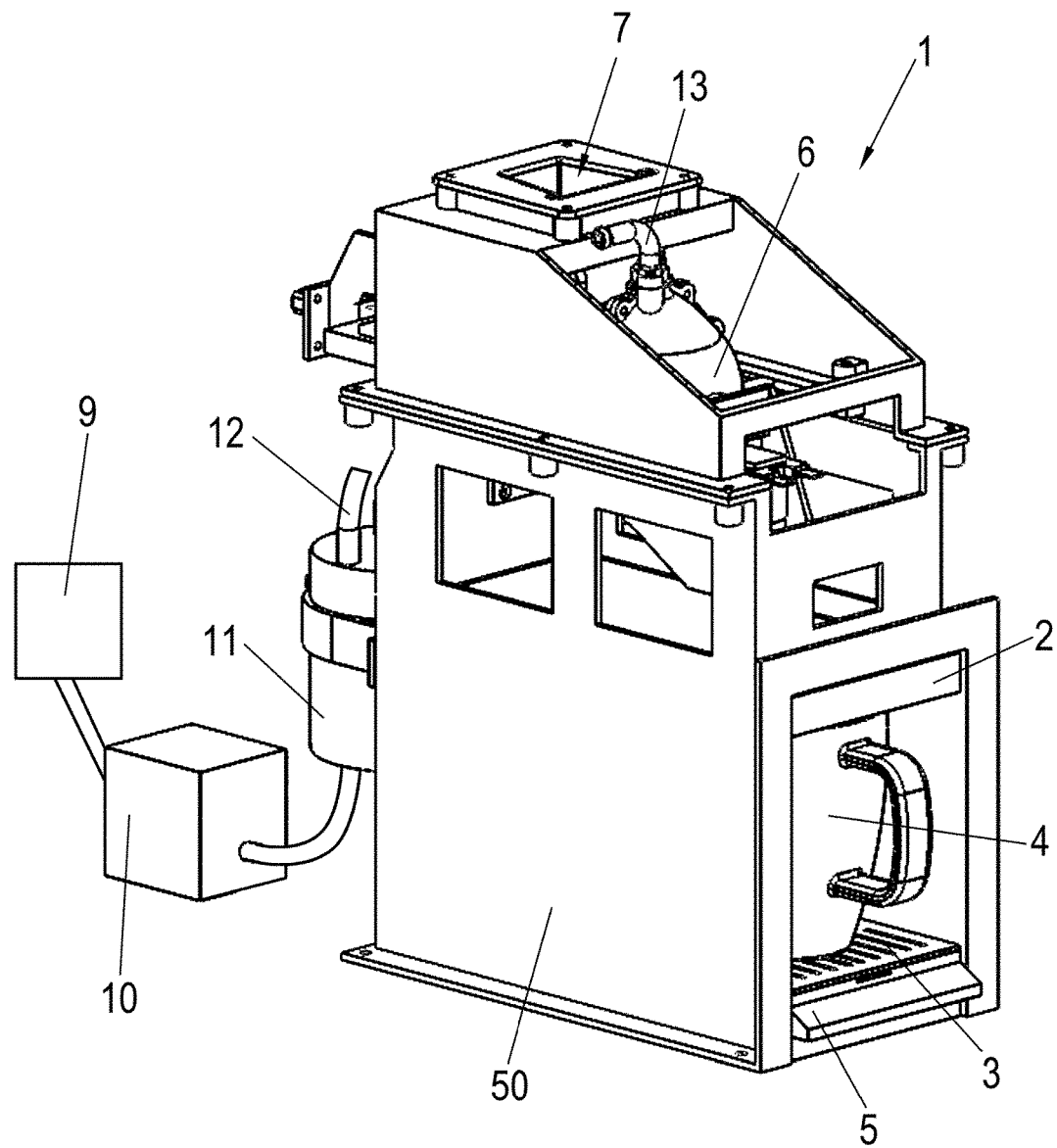
FIG. 1 shows a perspective view of an apparatus for preparing a brewed beverage.

An apparatus 1 for preparing brewed beverages comprises a removable collecting container 2 which is arranged in a housing 50. The collecting container 2 preferably consists of two parts: a container with a water-permeable base for accommodating capsules and a container underneath for collecting water. A support 3 with openings for depositing a vessel 4 is arranged on the collecting container 2. A gripping section 5 for pulling out the collecting container 2 is provided beneath the support 3.

The apparatus 1 for preparing brewed beverages further comprises a brewing chamber 6, which is provided adjacent to an insertion chute 7 for capsules.

Figure 2:
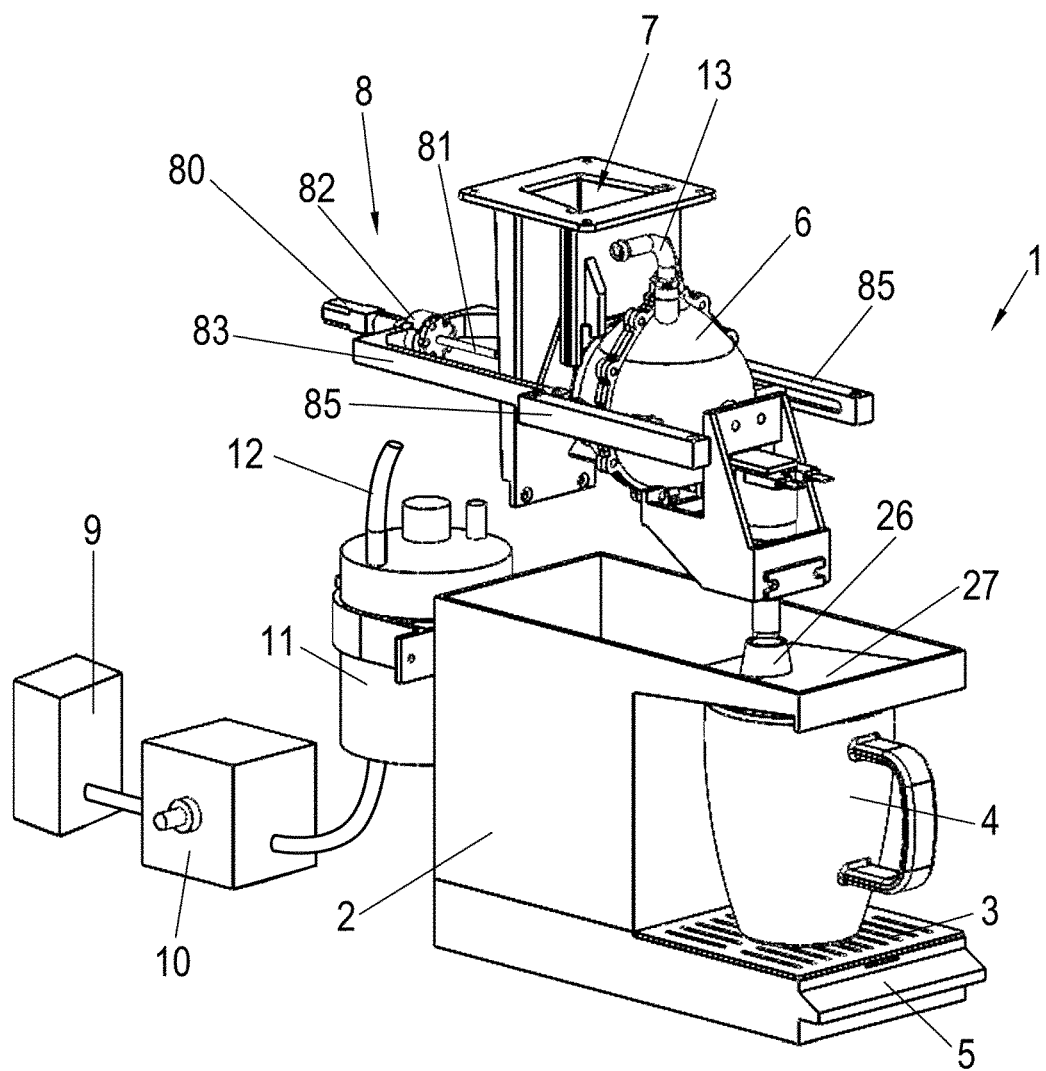
FIG. 2 shows a perspective view of the apparatus of FIG. 1 without the housing.

As is shown in FIG. 2, the insertion chute 7 for capsules is disposed between the brewing chamber 6 and a drive device 8. The brewing chamber 6 can be moved relative to the insertion chute 7 via the drive device 8. An electric motor 80 is provided for this purpose, which drives a spindle 81 via a gear, on which spindle a spindle nut 82 is mounted in a torque-proof manner.

Arms 83 which are connected to the spindle nut 82 are displaced linearly by rotation of the spindle 81. The arms 83 engage around the brewing chamber 6 on opposite sides and are guided on linear guides 85. The guide 85 can be formed as a groove or rail for example. The brewing chamber 6 is thus linearly movable.

The apparatus 1 for preparing brewed beverages further comprises a schematically shown tank 9 for fresh water, which can be formed in a removable manner. The tank 9 is provided with a pump 10, via which a heating device 11 in form of a boiler is supplied. A line 12, which is only partly shown in FIG. 2, leads from the heating device 11 to an inlet line 13 above the brewing chamber 6. A filter can optionally also be provided between the inlet line 13 and the tank 9.

Figure 3:
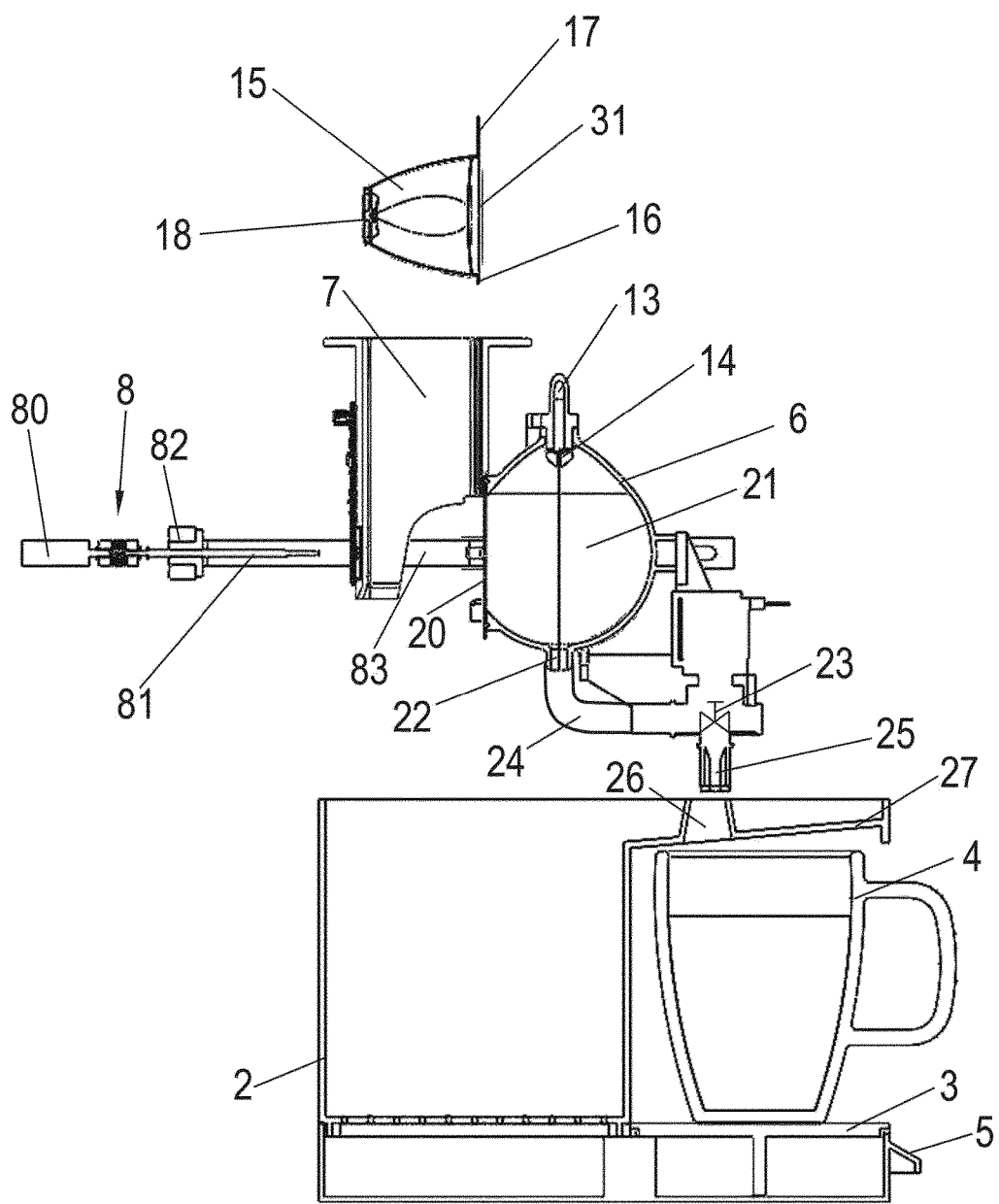
FIG. 3 shows a sectional view of the apparatus of FIG. 1 without the housing prior to the insertion of the capsule.

FIG. 3 shows the apparatus 1 in detail. A capsule 15 is provided above the insertion chute 7, which capsule is formed in a cup-like manner and comprises an opening on one side which is sealed with a screen 31. The screen 31 is fixed to an edge 16 which is formed in an asymmetric manner and comprises on one side a protruding section 17 as a gripping region. As a result of guide means on the base of the capsule 15 which are also asymmetric, the capsule is thus inserted in a predetermined position and orientation into the insertion chute 7, which comprises a respective recess with guide means for the positioning of the capsule 15. On the side opposite the opening, the capsule 15 comprises a base 18 on which markings are arranged for identifying the capsule 15. Such markings can be formed as a colour coding, an optical coding, an electromagnetic coding or in any other way in order to identify a specific type of capsule in a predetermined position. By reading the coding of the capsule 15 on the apparatus, the filling quantity of hot water for the brewing chamber 6, the temperature and the brewing time can be set via the controller. The control of other parameters via the coding is also possible.

Figure 4:
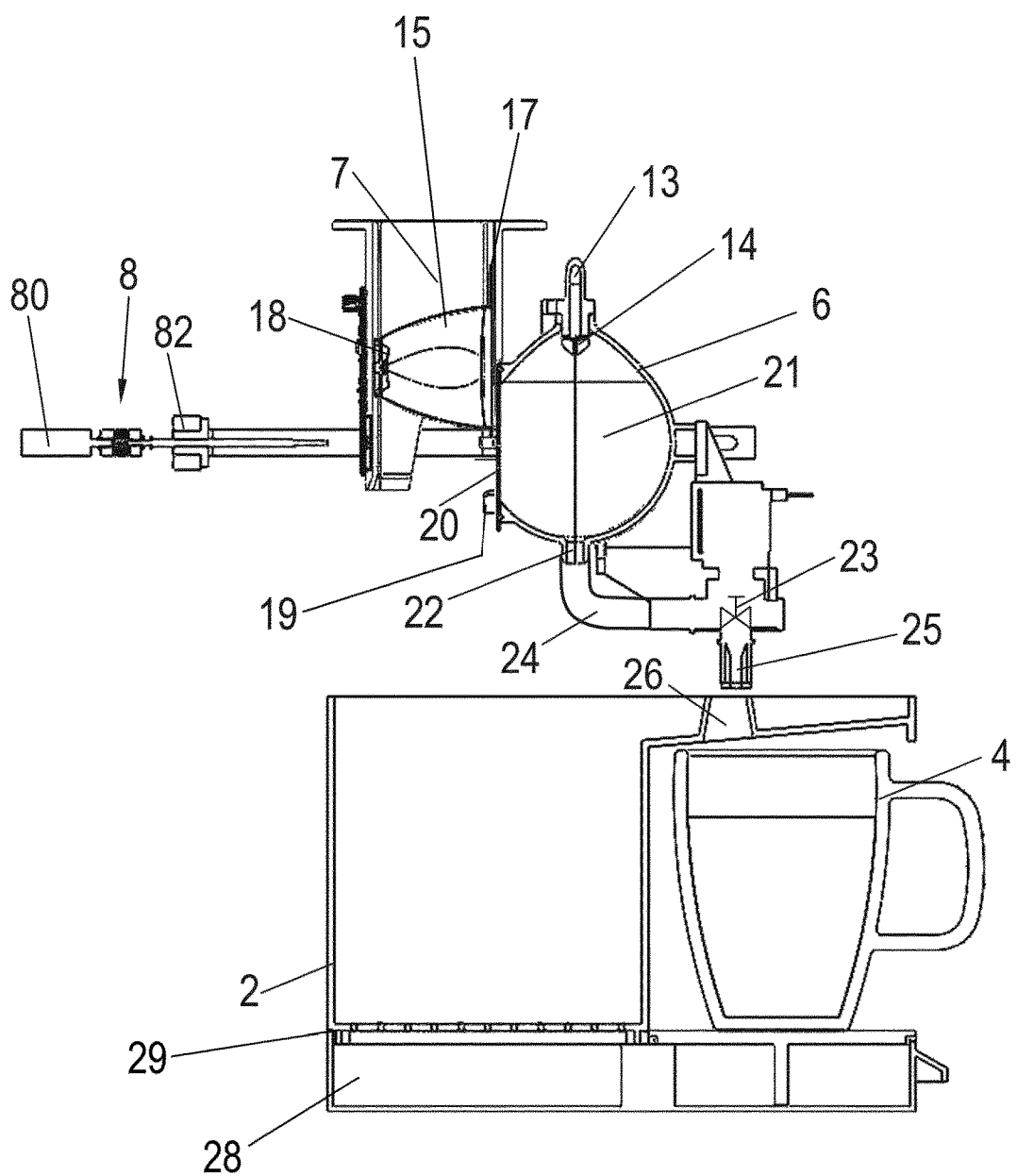
FIG. 4 shows a sectional view of the apparatus of FIG. 1 without the housing during insertion of the capsule.

The capsule 15 is inserted at first into the insertion chute 7 for the brewing process, as shown in FIG. 4. The capsule 15 slides downwardly until it is arranged at a lateral opening 20 of the brewing chamber 6. Retainers 19 are provided for this purpose on the exterior side of the brewing chamber 6, which retainers prevent that the capsule 15 slips in the downward direction beyond the position shown in FIG. 5.

Figure 5:
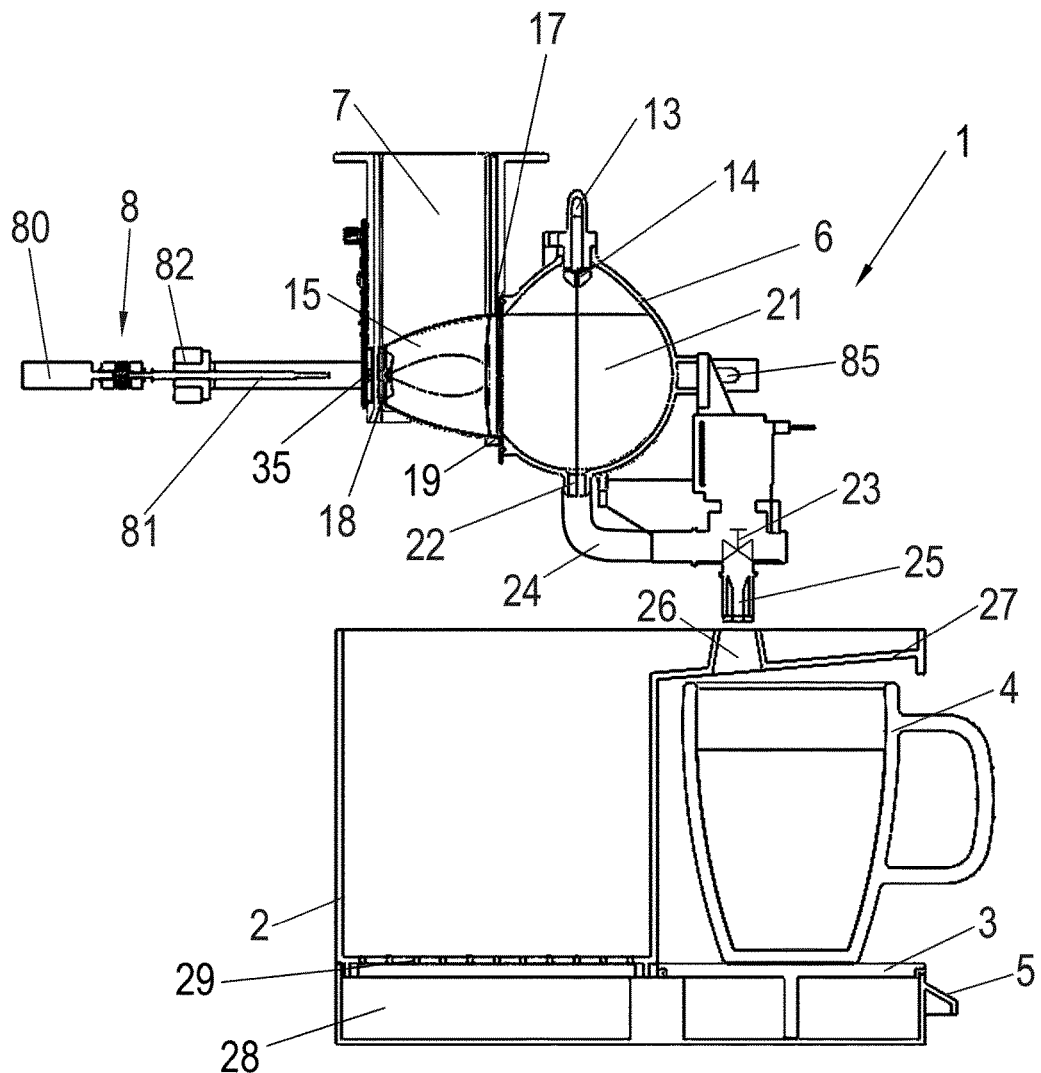
FIG. 5 shows a sectional view of the apparatus of FIG. 1 with the capsule in the brewing position.

FIG. 5 shows the brewing position to which the brewing chamber 6 is moved after the insertion of the capsule 15. The spindle 81 is turned for this purpose by the electric motor 80 in order to move the arms 83 along the guide 85 in FIG. 5 to the left, and in order to thus press a seal adjacent to the opening 20 at the brewing chamber 6 against the edge 16 of capsule 15 and to ensure sealing. The capsule 15 and an interior space 21 of the brewing chamber 6 thus form a unit, wherein the interior space 21 of the brewing chamber 6 and the interior of the capsule 15 are separated from each other by the screen 31. The interior space 21 of the brewing chamber 6 is several times larger than an interior space of the capsule 15, e.g. more than four times as large, so that the brewing beverage is mainly disposed in the brewing chamber 6 and only a minor portion in the capsule 15, which simplifies the dispensing of the brewing beverage.

In the brewing position, hot water is introduced via the inlet line 13 from the heating device 11 into the brewing chamber 6, for which purpose a nozzle 14 is provided at the end of the inlet line 13 which protrudes with a tip into the interior space 21 of the brewing chamber 6. The brewing chamber 6 comprises an outlet 22 at the bottom end, which outlet is connected via a line 24 to a valve 23. The introduced hot water is collected in the brewing chamber 6 by closing the valve 23 and rises over the outlet 22 in order to reach the material contained in the capsule 15 for brewing a beverage, especially tea. The preparation of the brewed beverage can be adjusted individually via the controller by previous reading of the coding on the capsule 15 via a reader device 35, e.g. green tea can be prepared differently than black tea, fruit tea or any other brewed or infusion beverage. Furthermore, a cleaning or service program can be started by reading the coding.

The valve 23 can be opened after the brewing process so that the brewed beverage flows from the brewing chamber 6 via the outlet 22 and the line 24 into a feed nozzle 25, from where it is introduced into a vessel 4. A passage 26 or an opening is disposed between the feed nozzle 25 and the vessel 4, so that the hot beverage can flow without obstruction into the vessel 4. The valve 23 can be closed again after the preparation of the brewed beverage.

Figure 6:
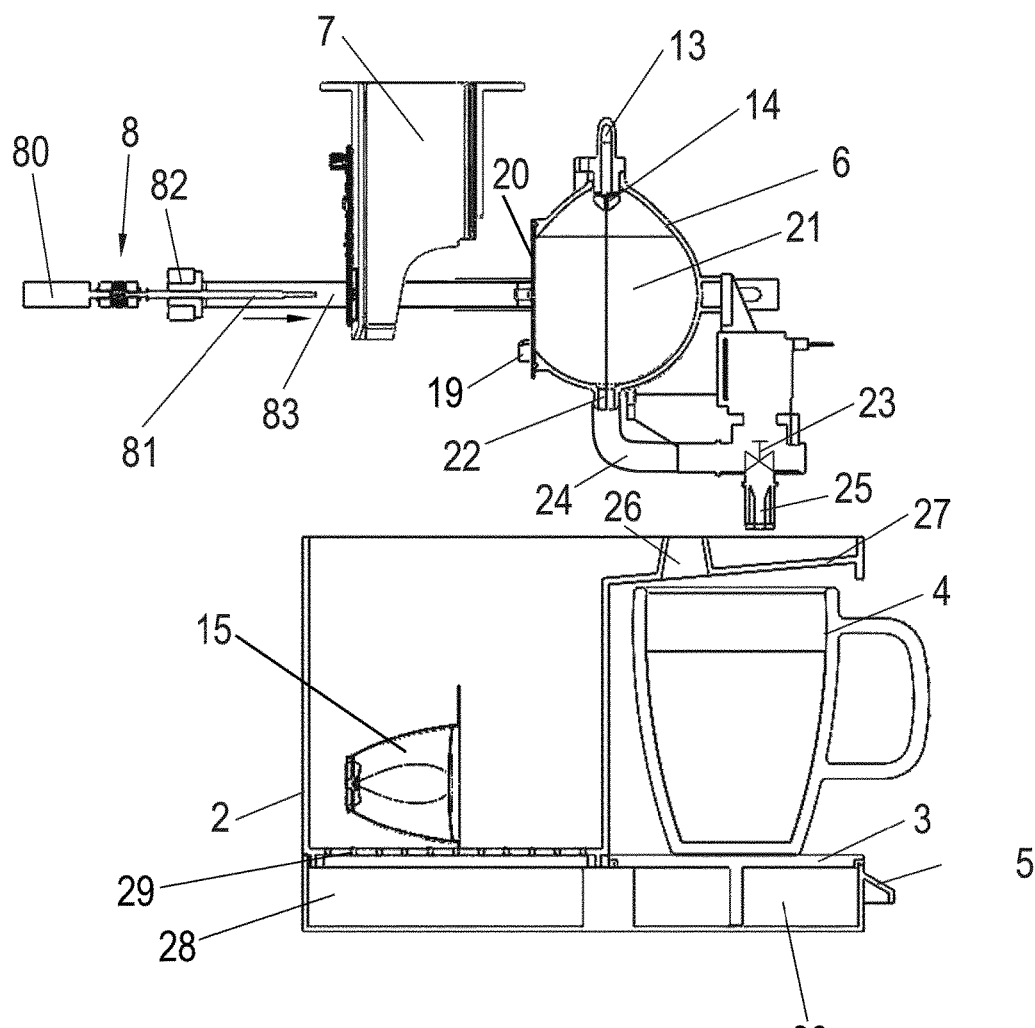
FIG. 6 shows a sectional view of the apparatus of FIG. 1 after the ejection of the capsule in a rinsing position.

After the brewing process, the brewing chamber 6 can be displaced via the drive device 8 according to the arrow in FIG. 6 so that the capsule 15 is removed from the holding position adjacent to the lateral opening 20 on the brewing chamber 6 and drops in the downward direction. The capsule 15 drops into the collecting container 2 and onto a screen 29 or a grate which is arranged above a collecting basin 28. The displacement of the brewing chamber 6 simultaneously also displaces the line 24 and the feed nozzle 25, which is now no longer arranged above the passage 26 but above a guide element 27. The brewing chamber 6 can now be rinsed, in that hot water is injected from the heating device 11 via the nozzle 14 into the brewing chamber 6, so that the hot water can remove residues of the brewing process. The hot water can be partly introduced through the opening 20 into the collecting container 2 in a direct manner and is introduced otherwise via the outlet 22 and the line 24 into the feed nozzle 25. The rinsing water then reaches the guide element 27 from there, which is formed as a sloping surface above the vessel 4. The rinsing water reaches the collecting basin 28 of the collecting container 2 via the guide element 27. The guide element 27 can also be formed as a channel or a groove instead of a sloping surface.

If after the removal of the vessel 4 a small quantity of liquid is introduced through the passage 26, this liquid can be collected in a second collecting basin 30 or a drip tray beneath the screen 31. The collecting container 2 can be removed as a unit from the housing 50 of the apparatus 1 so that the two collecting basins 28 and 30 on the collecting container 2 can be emptied. Furthermore, the collecting container 2 above the screen 29 is removable so that the used capsules 15 can also be emptied in a simple way.

Figure 7:
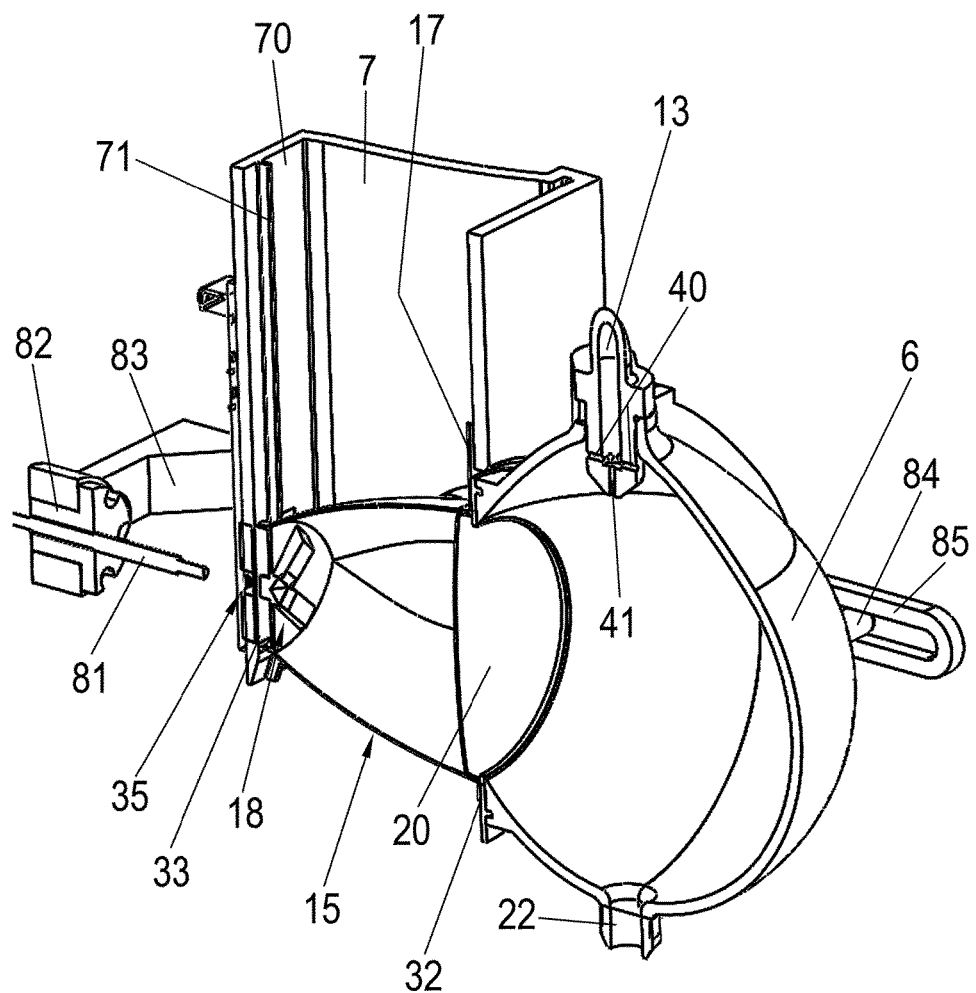
FIG. 7 shows a perspective detailed view of the brewing chamber of the apparatus of FIG. 1 with the capsule in the brewing position.

FIG. 7 shows the brewing chamber 6 in detail. The nozzle 14 is situated on the upper side of the brewing chamber 6, by means of which hot water is introduced for the brewing process or for the rinsing process. For this purpose, the nozzle 14 comprises several openings 40 which are distributed over the circumference, through which the hot water can be injected into the brewing chamber 6. A liquid film is thus formed on the side walls of the brewing chamber 6, which can be used on the one hand for rinsing and on the other hand for the brewing process. Furthermore, an opening 41 is provided downwardly on the nozzle 14 through which hot water can be injected, e.g. when hot water needs to be refilled during the brewing process. The openings 40 and 41 can also be formed to be optionally switchable via valves. Alternatively, the opening 41 can also be formed in the direction of the capsule instead of perpendicularly in the downward direction.

The brewing chamber 6 is formed in a substantially spherical way and comprises a parabolic section in the upper region on which the nozzle 14 is provided.

The brewing chamber 6 comprises retainers 84 or pins on its exterior side which are mounted in the guide 85.

The brewing chamber 6 can accommodate a volume of between 0.1 l to 1.0 l, especially 0.15 l to 0.7 l, depending on the number of portions of the brewed beverage that need to be prepared at once.

Figure 8:
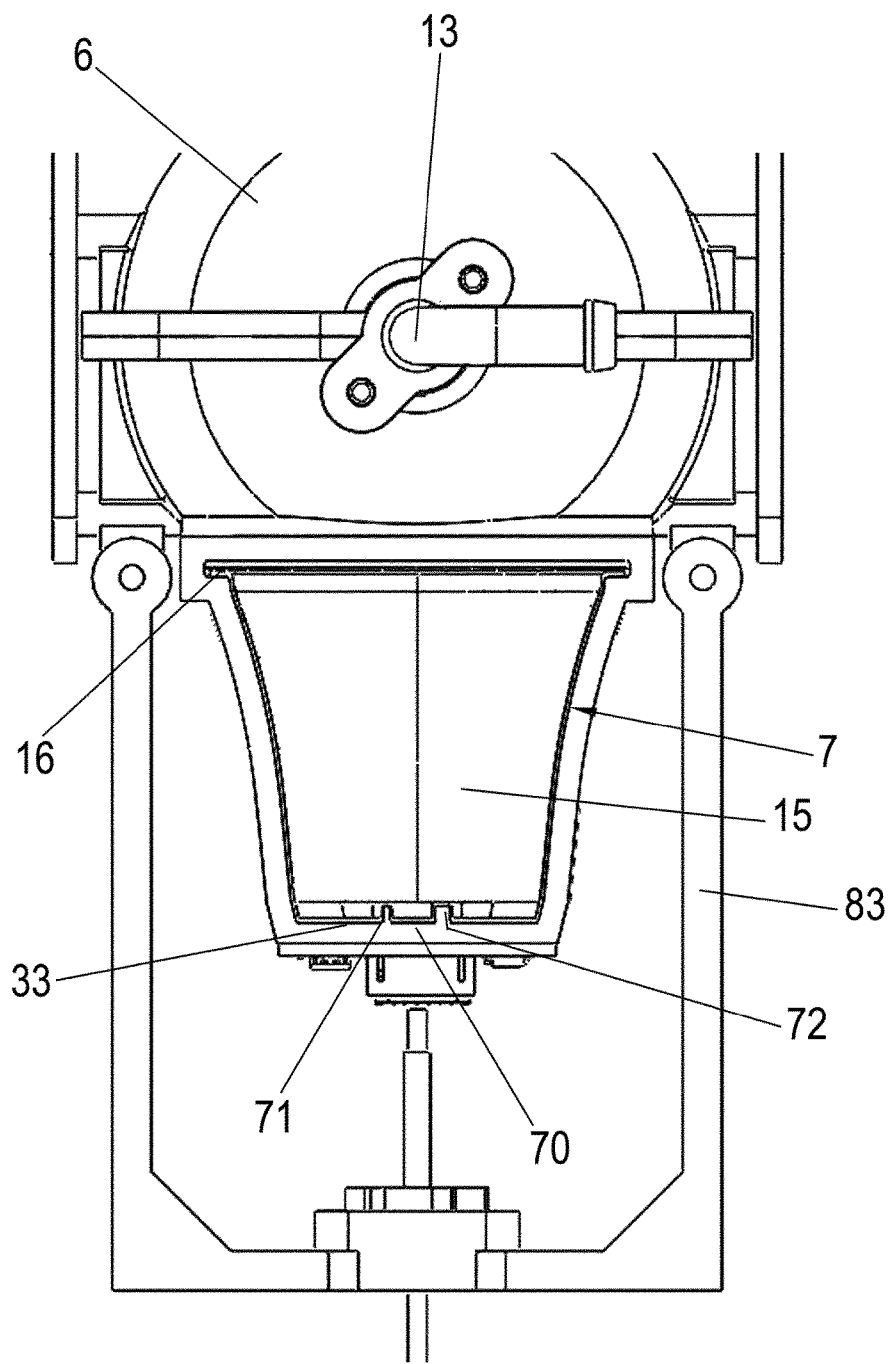
FIG. 8 shows a top view of the insertion chute of the apparatus of FIG. 1.

Furthermore, FIGS. 7 and 8 show that the insertion chute 7 comprises a surface 70 on the side of the base 18 of the capsule 15, from which a first guide strip 71 and a second guide strip 72 protrude. The guide strips 71 and 72 have a different width and are arranged asymmetrically in relation to a central plane of the capsule 15 so that the capsule 15 can only be inserted into the insertion chute 7 in a predetermined position.

A base area 33 with grooves for accommodating the guide strips 71 and 72 are provided at the height of the lateral opening 20 adjacent to the base 18 of the capsule 15, on which the capsule 15 is supported after insertion when the capsule 15 rests on the positioning means 19. It is thus prevented in the insertion position and the brewing position that the capsule 15 can drop into the insertion chute 7. When the brewing chamber 6 is moved after the brewing process and moved away from the insertion chute 7, the capsule can drop downwardly into the collecting container 2 as a result of gravity. It may occur that the capsule 15 attaches with the edge 16 to an annular seal 32 on the brewing chamber 6 and is moved together with the brewing chamber 6. In order to definitely ensure a detachment of the capsule 15, a stop can be arranged in the path of displacement of the capsule, e.g. an upwardly protruding section 17, so that the capsule 15 is released from the brewing chamber 6 after a specific amount of travel and it is ensured that the capsule 15 drops into the collecting container 2.

It is ensured by the electrical drive device 8 that the capsule 15 can be ejected automatically. A rinsing process can thus be initiated after each brewing process, so that it is prevented that the surface of the brewing chamber 6, the outlet 22 and the line 24 are soiled. The rinsing can be carried out automatically within 30 seconds for example after the brewing process, without the user having to trigger the rinsing process.

Other drive devices can also be used instead of the illustrated drive device 8 with the spindle 81, which other drive devices linearly move or also pivot the brewing chamber 6. The brewing chamber 6 can also be moved along a curve guide for example so as to be moved between an insertion position, a brewing position and an ejection or rinsing position.

Figure 9:
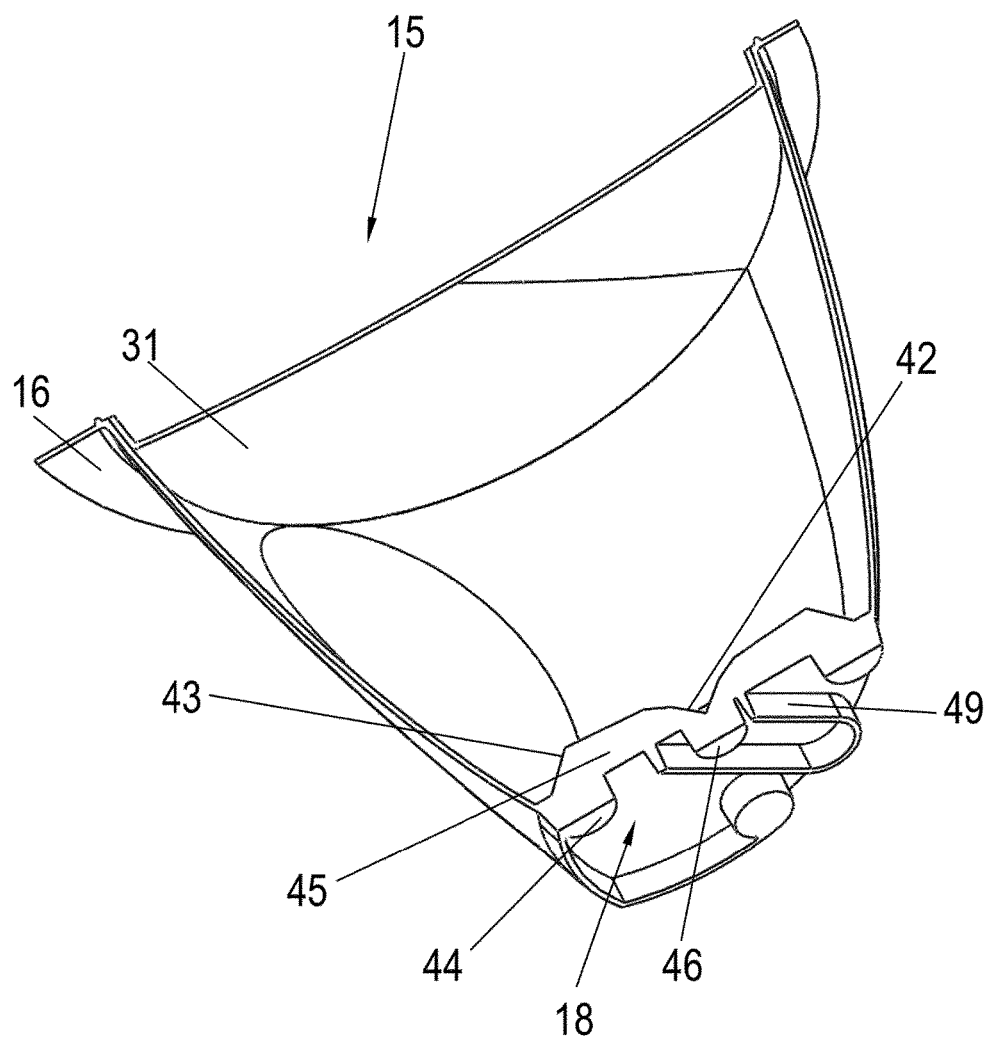
FIG. 9 shows a sectional perspective view of the capsule.

The capsule 15 is shown in FIG. 9 in a sectional view. It comprises an interior space which is sealed by a screen 31 or a grate. In order to maintain the aroma of the contents of the capsule over a longer period of time, the screen 31 or the grate can be sealed with a cover foil, which is removed entirely or partly prior to the insertion into the insertion chute 7. At least one light injection surface 46, at least one light deflection apparatus 42 and 43 and at least one light-output surface 44 are provided, which are used for an optical recognition system. Light conductors 45 are formed for this purpose on the base 18. A protruding guide profile 49 is further formed on the base, which interacts with the guide strips 71 and 72. Four light-output surfaces 44 are provided in the illustrated embodiment, on which a respective light detector detects or does not detect the emission of light. This leads to four types of coding on the base 18 of the capsule 15, so that 16 different types of capsules can be recognised. It is obviously also possible to vary the number of the light-output surfaces 44 and the light detectors 36. It is also possible to arrange the light sources and light sensors in a different way, so that the light-output surfaces 44 become the light injection surfaces and the middle light injection surface 46 becomes a light-output surface.

Figure 10:
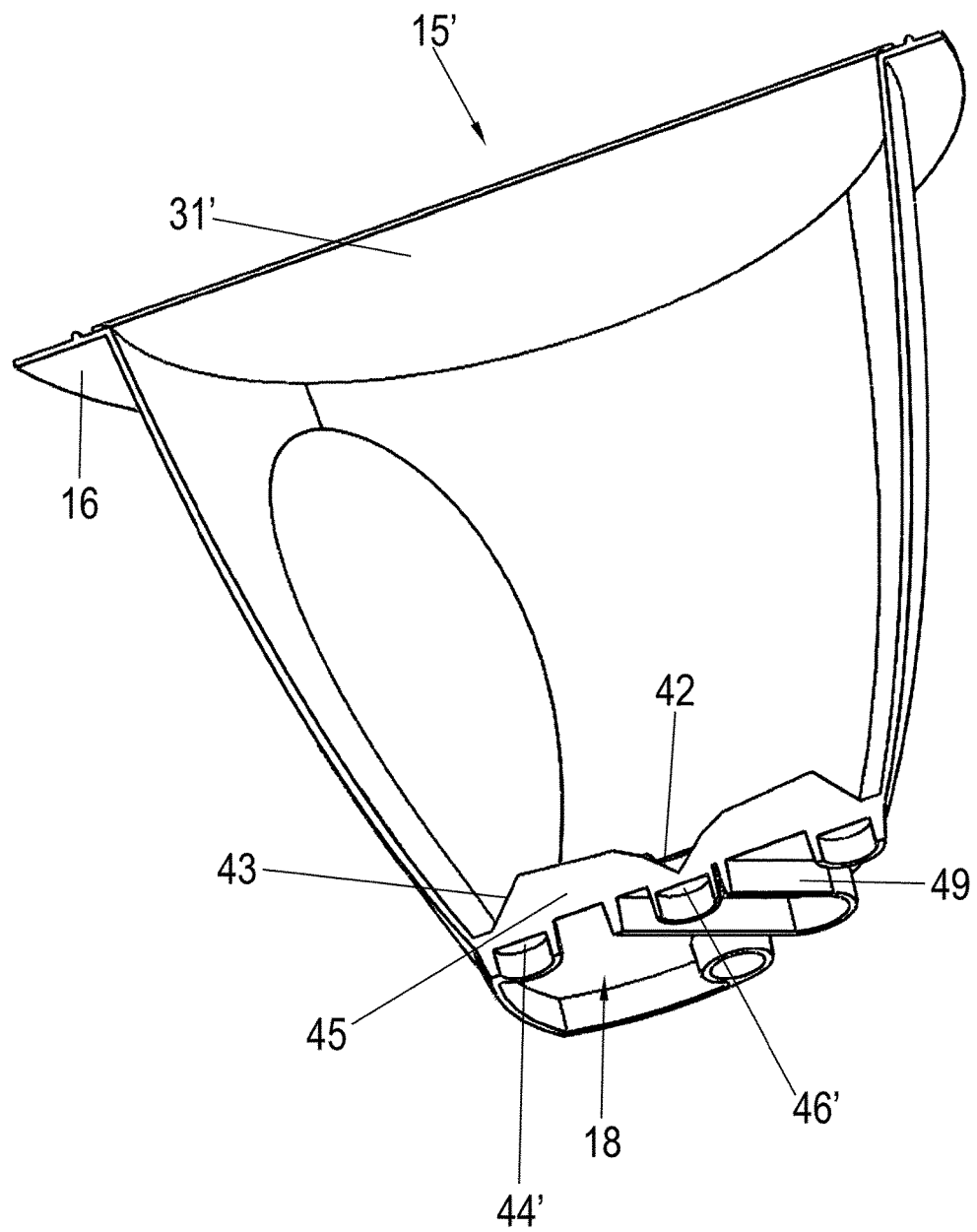
FIG. 10 shows a sectional perspective view of a further embodiment of the capsule.

FIG. 10 shows an embodiment of a capsule 15' which is modified over that of FIG. 9. Capsule 15' comprises four light-output surfaces 44' and one light injection surface 46' on the base, which are each arranged in a protective manner in a cup-shaped receptacle. The light-output and injection surfaces 44' and 46' which are oriented parallel to the surface of the base 18 are thus arranged in a protective manner by a downwardly protruding ring. Furthermore, a screen 31' is fixed to the upper edge 16 of the capsule 15'.

In the illustrated embodiment, the brewing chamber 6 is formed with a single wall, e.g. made of plastic, metal or glass. It is also possible to insulate the brewing chamber 6 for the purpose of increasing temperature stability, e.g. with a casing made of insulating material or by a formation with a double wall. In this case, the brewed beverage can also be output in a sufficiently tempered manner even in the case of long brewing times of more than 5 minutes for example.

LIST OF REFERENCE NUMERALS

1 Apparatus
2 Collecting container
3 Support
4 Vessel
5 Gripping section
6 Brewing chamber
7 Insertion chute
8 Drive device
9 Tank
10 Pump
11 Heating device
12 Line
13 Inlet line
14 Nozzle
15 Capsule
16 Edge
17 Section
18 Base
19 Retainer
20 Opening
21 Interior space
22 Outlet
23 Valve
24 Line
25 Feed nozzle
26 Passage
27 Guide element
28 Collecting basin
29 Screen
30 Collecting basin
31 Screen
32 Seal
33 Projection
35 Reader device
40 Opening
41 Opening
42 Light deflection apparatus
43 Light deflection apparatus
44 Light injection surface
45 Light conductor
46 Light-output surface
49 Guide profile
50 Housing
70 Surface
71 Guide strip
72 Guide strip
80 Electric motor
81 Spindle
82 Spindle nut
83 Arm
84 Retainer
85 Guide

The invention claimed is:

1. A method for preparing a brewed beverage, comprising the following steps:
    positioning a capsule with an ingredient for brewing the beverage at a lateral opening of a brewing chamber;
    heating and conveying water to the brewing chamber;
    introducing the heated water into the brewing chamber;
    brewing the beverage in the brewing chamber by filling the capsule with heated water;
    opening of a valve on an outlet of the brewing chamber and filling a vessel with the brewed beverage through a feed nozzle;
    subsequent to the opening and filling steps, moving the brewing chamber together with the feed nozzle from a brewing and filling position to a rinsing position, wherein in the brewing and filling position the capsule is positioned at the brewing chamber and the feed nozzle is at a filling position above a passage for filling the vessel, and in the rinsing position the capsule is removed from the brewing chamber and the feed nozzle is above a guide element for directing water for disposal; and
    when the brewing chamber is in the rinsing position, rinsing the brewing chamber with rinse water and disposing of the rinse water via the feed nozzle and the guide element.

2. The method according to claim 1, wherein the rinsing includes injecting heated water via an inlet into the brewing chamber for rinsing the brewing chamber.

3. The method according to claim 1, wherein the moving includes moving the brewing chamber relative to an insertion chute for the capsule in order to eject the capsule to a collecting container.

4. The method according to claim 1, further including arranging a stop for holding the capsule in place during the brewing step such that during the moving step to move the brewing chamber from the brewing and filling position to the rinsing position, the stop is moved to permit separation of the capsule from the brewing chamber.

5. The method according to claim 1, wherein the ingredient is tea and the brewed beverage is a brewed tea beverage, and the positioning step includes positioning the capsule containing the tea so that the tea beverage is brewed in the brewing chamber during the brewing step.

6. An apparatus for preparing a brewed beverage, comprising:
   a device to produce heated water and to convey the heated water;
   a brewing chamber into which the heated water is introduced, the brewing chamber having a lateral opening and a bottom side;
   a positioning device for positioning a capsule with an ingredient for brewing a beverage at the lateral opening of the brewing chamber;
   an outlet on the bottom side of the brewing chamber;
   a feed nozzle coupled to the outlet;
   a passage arranged between the feed nozzle and a vessel to be filled with brewed beverage;
   an inlet on the brewing chamber for introducing hot water into the brewing chamber;
   a guide element arranged for guiding rinse water passing through the outlet of the brewing chamber;
   a nozzle coupled to the inlet, wherein the nozzle includes a plurality of openings distributed over a circumference of the nozzle through which the hot water passes into the brewing chamber;
   a drive device to move the brewing chamber, wherein the brewing chamber is movable, together with the feed nozzle, by the drive device in order to move the feed nozzle from a filling position above the passage for filling the vessel to a rinsing position above the guide element.

7. The apparatus according to claim 6, wherein the nozzle includes a tip and protrudes with the tip into an interior space of the brewing chamber.

8. The apparatus according to claim 6, wherein the inlet is arranged on an upper side of the brewing chamber, and further including a switchable valve on the outlet to control a length of the brewing or infusion time.

9. The apparatus according to claim 6, wherein a volume of the brewing chamber is at least twice as large as a volume of the capsule, and further including a screen arranged between the brewing chamber and an interior space of the capsule.

10. The apparatus according to claim 6, further comprising a collecting container for collecting capsules, wherein the lateral opening of the brewing chamber is arranged above a collecting container, and the capsule drops into the collecting container during a displacement of the brewing chamber by the drive device.

* * * * *